United States Patent [19]

Xiong et al.

[11] Patent Number: 5,116,137
[45] Date of Patent: May 26, 1992

[54] TEMPERATURE MEASURING PYROMETER PROBE WHICH COMPENSATES FOR RADIATION HEAT TRANSFER AND PNEUMATIC LOSSES

[75] Inventors: Tian-Yu Xiong, Darien; Lloyd McHie, South Holland, both of Ill.

[73] Assignee: Institute of Gas Technology, Chicago, Ill.

[21] Appl. No.: 501,130

[22] Filed: Mar. 29, 1990

[51] Int. Cl.$^5$ .................... G01K 13/02; G01K 1/14
[52] U.S. Cl. .................... 374/132; 374/135; 374/208; 374/138
[58] Field of Search ............. 374/132, 133, 134, 135, 374/138, 208, 121; 364/557

[56] References Cited

U.S. PATENT DOCUMENTS

| | | | |
|---|---|---|---|
| 2,922,305 | 1/1960 | Wehrman | 374/135 X |
| 2,928,279 | 3/1960 | Schober | 374/138 |
| 2,970,475 | 2/1961 | Werner | 374/135 X |
| 3,111,032 | 11/1963 | Wormser et al. | 374/169 |
| 3,596,518 | 8/1971 | Kirkpatrick | 374/134 |
| 3,702,076 | 11/1972 | Georgi | 374/169 |
| 3,877,307 | 4/1975 | Georgi | 374/169 |
| 3,878,724 | 4/1975 | Allen | 374/169 |
| 3,942,123 | 3/1976 | Georgi | 328/1 |
| 4,152,938 | 5/1979 | Danniger | 374/138 |
| 4,187,434 | 2/1980 | Pater, Jr. et al. | 374/135 X |
| 4,305,286 | 12/1981 | Beuth et al. | 374/134 |
| 4,396,791 | 8/1983 | Mazzoni | 374/141 X |
| 4,480,930 | 11/1984 | DeZubay et al. | 374/134 |
| 4,896,281 | 1/1990 | Mack | 364/557 |
| 4,911,009 | 3/1990 | Maeda et al. | 374/135 |

FOREIGN PATENT DOCUMENTS 0006578 1/1977 Japan .................... 374/132

OTHER PUBLICATIONS

Gabriel, F. K. et al., "Fluid Pulsed Thermocouple Rake System for Automatic High Gas Temperature Measurements", American Society of Mechanical Engineers Paper No. 82-GT-107, Mar. 1982.

Krestschmer, D. et al., "The Pulsed Thermocouple for Gas Turbine Application", Journal of Engineering for Power, Jan. 1977, pp. 1-10.

Glawe, G. E. et al., "A New Approach to the Pulsed Thermocouple for High Gas Temperature Measurements", NASA TMX-71883, presented at the 22nd International Instrumentation Symposium, San Diego, Calif., May 25-27, 1976.

Wormser, A. F. and Pfuntner, R. A., "Pulse Technique Extends Range of Chromel-Alumel to 7000° F.", Instruments and Control Systems, May 1964, pp. 101-103.

*Primary Examiner*—Stuart S. Levy
*Assistant Examiner*—Joseph A. Rhoa
*Attorney, Agent, or Firm*—Speckman & Pauley

[57] ABSTRACT

An apparatus and process for a temperature measuring pyrometer probe that measures gas temperatures above the melting point of conventional thermocouple material. The apparatus is used to calculate radiation heat losses and compensate for pneumatic cooling from the thermocouple junction of the pyrometer probe. The pyrometer probe has an inner hollow body which defines an inner chamber. The inner hollow body has an open end and the inner chamber is in communication with ambient gas surrounding the pyrometer probe. The inner hollow body is mounted within an outer hollow body and such mounting defines cooling channels. The cooling channels accommodate fluid flow which cools the inner hollow body. The ambient gas is directed into a converging-diverging nozzle, mounted within the inner hollow body, toward a thermocouple junction. The converging-diverging nozzle has a wall suction channel through which a boundary layer of the ambient gas is drawn away from the thermocouple junction. The thermocouple junction is mounted within a throat section of the converging-diverging nozzle. The pyrometer probe is intermittently cooled with gas by pulsing reverse cooling gas flow through the pyrometer probe. A computing system is used to continuously acquire temperature signals from the thermocouple and alternate the cooling gas flow and the ambient gas flow through the inner chamber of the pyrometer probe based on the temperature response. The computing system calculates radiation heat transfer losses, pneumatic cooling of the pyrometer probe, and instantaneous gas temperatures.

15 Claims, 2 Drawing Sheets

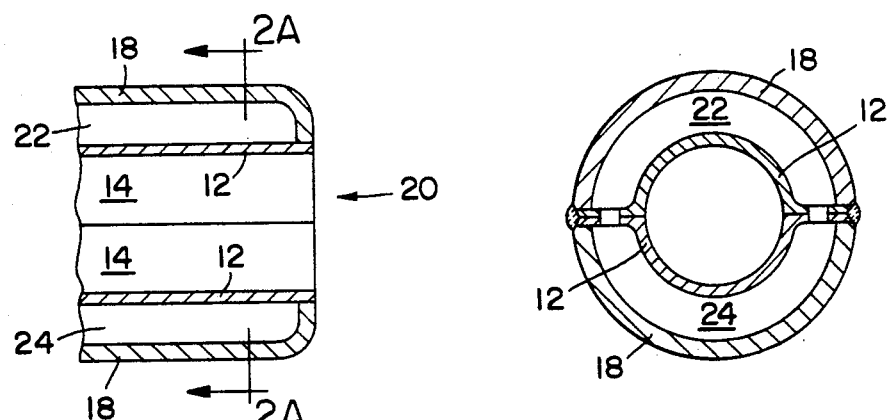
FIG. 2
FIG. 2A
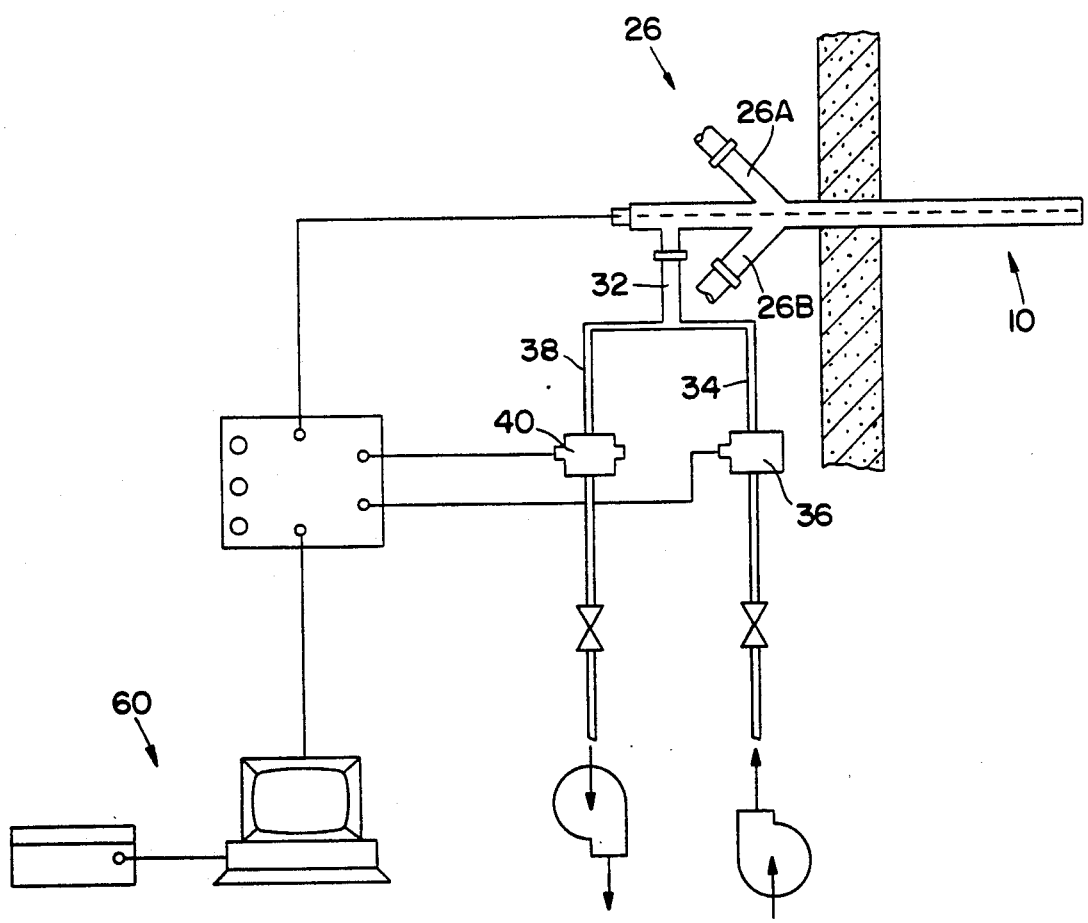
FIG. 3

TEMPERATURE MEASURING PYROMETER PROBE WHICH COMPENSATES FOR RADIATION HEAT TRANSFER AND PNEUMATIC LOSSES

BACKGROUND OF THE INVENTION

1. Field of the Invention

This invention relates to an apparatus and process for a temperature measuring pyrometer probe that measures gas temperatures above the melting point of conventional thermocouples and calculates and compensates for radiation heat losses and pneumatic cooling of the pyrometer probe.

2. Description of the Prior Art

U.S. Pat. No. 4,480,930 teaches a pulse cooled thermocouple temperature measuring apparatus. The apparatus includes a support member having rake channels. As taught by the '930 patent, each thermocouple is supported within a rake channel which has an open end exposed to hot gas. The thermocouple wires and the thermocouple junction are enclosed in mineral insulation which is encased in a steel sheath. To prevent melting, the thermocouple is cooled by pulsed cooling air flowing through the channels toward the thermocouples. A computing means responds to thermocouple signals to open a coolant valve so that cooling air may flow toward the thermocouple when the thermocouple temperature reaches a predetermined temperature. The computing means responds to the temperature signals and closes the cooling valve to enable a new temperature reading cycle after the thermocouple has cooled to a lower temperature. The computing means extrapolates temperatures which correspond to the temperature of the hot gas. The '930 patent teaches that extrapolation of the temperatures is based on the assumption of an exponential temperature curve. A disadvantage of the teachings of the '930 patent is that without air cooling the support member and the rake channels in which the thermocouple junctions are positioned, the system is severely limited to temperatures which slightly exceed the melting point of the materials. Another disadvantage is that the radiation heat transfer losses and pneumatic cooling of the system are assumed to be negligible and thus are not compensated.

The article by Gabriel, F. K., et al., "Fluid Pulsed Thermocouple Rake System for Automatic High Gas Temperature Measurements", American Society of Mechanical Engineers Paper No. 82-GT-107, 1982, teaches a multiple thermocouple pulse probe wherein each thermocouple operates in a transient mode up to a limiting temperature, at which point the thermocouple is cooled to a relatively low temperature in preparation for a subsequent transient heat-up cycle. The Gabriel et al. article does not teach any thermocouple junction or probe design which compensates for radiation heat transfer losses or pneumatic cooling of the probe channels.

The article by Kretschmer, D., et al., "The Pulsed Thermocouple for Gas Turbine Application", Journal of Engineering for Power, January 1977, pp. 1–10, teaches a mechanically pulsed, water cooled probe that is inserted into and out of a hot gas stream as a function of a predetermined temperature of the thermocouple. Gas is drawn into a sonic orifice of the probe. For the type of pulse thermocouple taught by the Kretschmer et al. article, it is assumed that radiation to the bead is very small due to the location of the thermocouple inside the probe and that any such heat losses should be taken into account through a calibration process. The effects of radiation are minimized by placing a shield around the thermocouple bead so that the bead is surrounded by walls having a temperature similar to that of the bead.

U.S. Pat. No. 3,111,032 teaches a water cooled temperature measurement apparatus for extending the range of a temperature sensor such as a thermocouple, which is used to measure temperatures of relatively hot liquids such as molten steel. The sensor is cyclically cooled to provide periods of exposure at a temperature lower than the measurement temperature. A disadvantage of the teachings of the '032 patent is that the apparatus does not account for radiation heat losses.

The NASA article by Glawe, G. E., et al., "A New Approach to the Pulsed Thermocouple for High Gas Temperature Measurements", NASA TMX-71883, presented at the 22nd International Instrumentation Symposium, San Diego, Calif., May 25–27, 1976, teaches a thermocouple that is cooled by a small jet of inert gas. Once the thermocouple is cooled, the cooling jet is shutdown and the thermocouple is allowed to again heat to near its melting point, at which time a temperature reading is taken and the thermocouple is again cooled. The article by Wormser, A. F. and Pfuntner, R. A., "Pulse Technique Extends Range of Chromel-Alumel to 7000° F.", Instruments and Control Systems, May 1964, pp. 101–103, teaches a pulsed thermocouple system having a thermocouple, a coolant system and a computer. The coolant flow is periodically interrupted to expose the thermocouple to the gas being measured. Before the thermocouple reaches its critical melting temperature, the coolant flow is restored and the cycle is repeated.

U.S. Pat. No. 4,305,286 teaches a temperature sensor system that has a thermocouple encased in a protective tube of heat-resistant material, such as ceramic. The thermocouple reciprocates between a retracted position exterior of the reactor and a measurement point within the reactor.

U.S. Pat. Nos. 3,702,076, 3,877,307 and 3,942,123 all teach electronic thermometers which have digital displays. U.S. Pat. No. 3,878,724 teaches a method and apparatus for reducing the response time of a sensor, such as a medical probe thermometer, positioned in a medium under observation.

SUMMARY OF THE INVENTION

It is an object of this invention to measure gas temperatures that are much greater than the melting point of conventional thermocouple materials.

It is another object of this invention to eliminate temperature measurement error caused by radiation heat loss from a thermocouple junction to surrounding objects when measuring flowing gas temperatures.

It is still another object of this invention to eliminate measurement error resulting from pneumatic cooling of the pyrometer probe when measuring flowing gas temperatures.

The above objects are achieved in the present invention with an apparatus that includes a temperature measuring pyrometer probe having an inner hollow body which defines an inner chamber. The inner chamber has an open end which forms communication between the inner chamber and ambient gas surrounding the pyrometer probe. The inner hollow body is mounted within an outer hollow body, so as to define cooling channels.

The cooling channels accommodate fluid flow which cools walls of the inner chamber. A converging-diverging nozzle is mounted within the inner hollow body. The converging-diverging nozzle has a wall suction channel through which a boundary layer portion of the incoming ambient gas is drawn away from the thermocouple junction. The thermocouple junction is mounted within a throat of the converging-diverging nozzle. The pyrometer probe is intermittently cooled with gas by pulsing reversed cooling gas flow through the converging-diverging nozzle. A computing means is used to control the cooling gas flow. The computing means emits a signal to control valves which continuously alternate the cooling gas flow and the ambient gas flow through the inner chamber and the converging-diverging nozzle. The thermocouple is electronically coupled to the computing means. The computing means is used to calculate radiation heat transfer losses associated with the thermocouple junction, and thus instantaneous gas temperatures.

In one preferred embodiment of this invention, the cooling channels include an inlet channel and an outlet channel. The inlet channel and the outlet channel are sealably separated from each other along a longitudinal axis of the pyrometer probe and are in communication with each other near the open end of the inner hollow body. Preferably, the fluid flowing through the cooling channels is a liquid, such as water.

In one preferred embodiment according to this invention, the converging-diverging nozzle includes two separate sections: an inlet section and an outlet section. The inlet section is secured within the inner hollow body, near the open end of the inner hollow body. The inlet section and the outlet section are separated from each other by a distance which defines the wall suction channel within the throat region of the converging-diverging nozzle. The outlet section is secured within the inner hollow body, downstream from the inlet section. As used throughout this specification and in the claims, the terms "downstream" and "converging-diverging" are relative to flow through the inner hollow body of the pyrometer probe when the pyrometer probe is operating with ambient gas flowing past the thermocouple junction. In a preferred embodiment, the inlet section and the outlet section are separated by a spacer ring.

In another preferred embodiment of this invention, the wall suction channel includes bypass through holes positioned within the outlet section. The bypass through holes are in communication with the wall suction channel. Preferably, four bypass through holes are evenly spaced around and approximately parallel to a centerline of the throat.

In one preferred embodiment of this invention, a support body is used to mount the thermocouple junction within and along a centerline of the throat, immediately downstream from the wall suction channel. A precise position of the thermocouple junction is important to ensure that the boundary layer of incoming gas does not contact the thermocouple junction. The support body is secured with respect to the inner housing body.

In another preferred embodiment according to this invention, the pyrometer probe has a control conduit in communication with the inner chamber. The control conduit is mounted to the pyrometer probe, downstream from the open end. The cooling gas flow is introduced into an inlet conduit which is in communication with the control conduit. A control valve is mounted within the inlet conduit for controlling the cooling ga flow through the inlet conduit. An outlet conduit is also in communication with the control conduit. A control valve is mounted within the outlet conduit for controlling the flow of incoming ambient gas.

The above objects are further achieved in the present invention with a method of eliminating temperature measuring error due to radiation heat transfer and pneumatic cooling effects in a temperature measuring pyrometer probe wherein ambient gas is selectively directed through a converging-diverging nozzle toward the thermocouple junction of the thermocouple. The ambient gas flowing past the thermocouple junction achieves sonic velocity. A boundary layer of the ambient gas flowing at or near a wall of the inlet section of the converging-diverging nozzle is drawn away from the thermocouple junction. Only a central portion of the ambient gas flows near the thermocouple junction.

Measured temperature signals emitted from the thermocouple junction are processed and recorded in real time. The computing means receives measured temperature signals emitted from the thermocouple junction and when such measured temperature signals are equal to predetermined temperature signals, the computer means emits a signal which is used to open a corresponding control valve and direct cooling gas flow through the inner hollow body to cool the thermocouple components and the inner hollow body. When measured temperature signals indicate that the thermocouple junction has been sufficiently cooled, flow through the inner hollow body is reversed and thus the ambient gas flows into the inner hollow chamber, which initiates a new temperature measuring cycle. The computing means calculates radiation heat transfer loss as well as pneumatic cooling for each measured temperature signal and extrapolates the actual gas temperatures.

BRIEF DESCRIPTION OF THE DRAWINGS

Further features of this invention will be apparent from the following more detailed description taken in conjunction with the drawings, wherein:

FIG. 2 is a cross-sectional side view of an end of a pyrometer probe according to one embodiment of this invention;

FIG. 2A is a cross-sectional view of a pyrometer probe, along line 2A—2A as shown in FIG. 2, according to one embodiment of this invention; and FIG. 3 is a schematic view of a temperature measuring pyrometer probe according to one embodiment of this invention.

DESCRIPTION OF THE PREFERRED EMBODIMENTS

Figure 1:
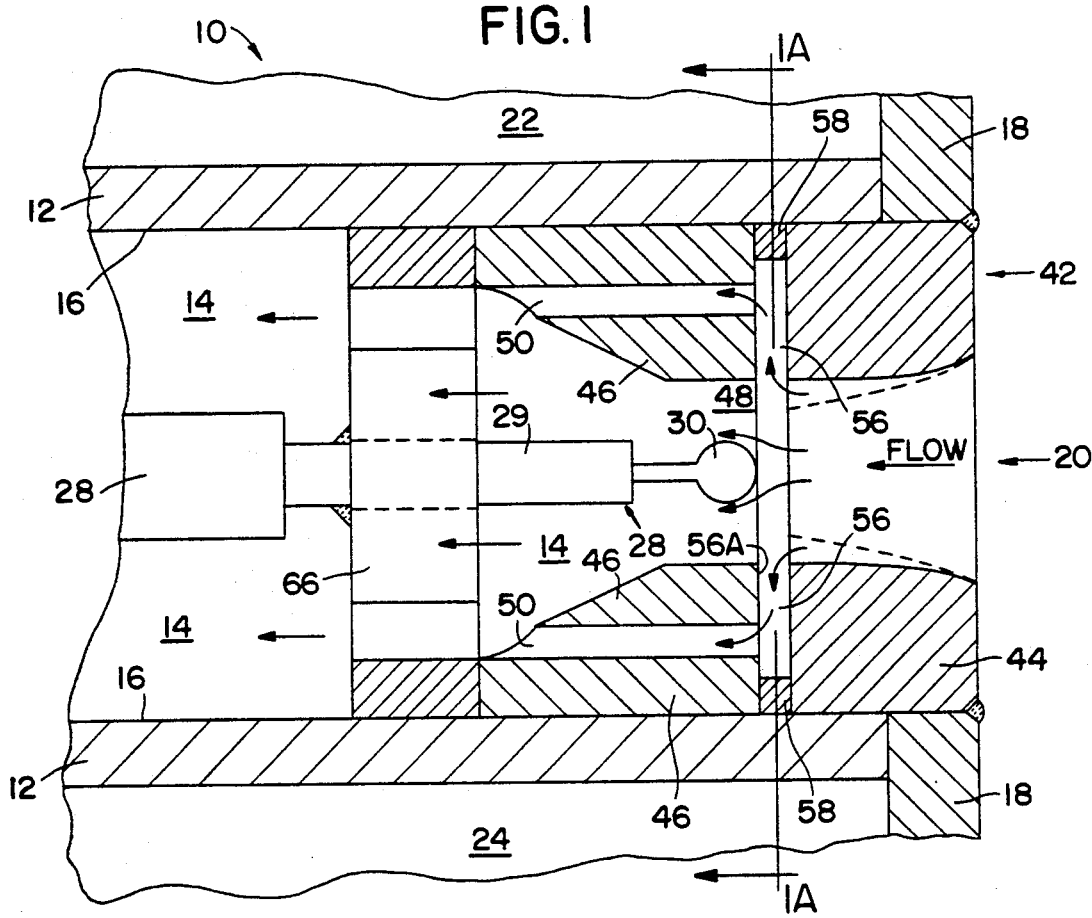
FIG. 1 is a partial cross-sectional side view of an open end section of a pyrometer probe, according to one embodiment of this invention.

Conventional pulse thermometries have adopted a simplified convective heat transfer model as a basis of thermocouple temperature response as described by:

$$T_g = \tau(dT/dt) + T \qquad \text{Equation 1}$$

where
$T_g$ = instantaneous gas temperature
T = transient temperature of the thermocouple
t = time, and
$\tau$ = thermocouple time constant.

Based on this equation, the temperature response of the thermocouple has been assumed to be an exponential function, in order to extrapolate the measured gas temperatures that may exceed the melting point of the thermocouple material. In conventional systems, cooling means are employed to prevent thermocouple junctions and pyrometer probes from melting. Cooling gas is normally pulsed through the pyrometer probe to accomplish cooling of the probe and the thermocouple junction. Radiation heat transfer from the thermocouple junction to the nozzle inlet means occurs in conventional systems, which results in significant temperature measurement errors. The measurement errors caused by radiation heat transfer are particularly significant at extremely high temperatures.

This invention provides compensation for such losses by adopting an accurate heat transfer model that adds a radiation term ($\epsilon T^4$) to Equation 1:

$$T_g = \tau(dT/dt) + T + \epsilon T^4 \qquad \text{Equation 2}$$

where $\epsilon$ = radiation factor, depending upon the structure and operating parameters. In this invention, the thermocouple response is considered a general function because the radiation heat transfer is considered.

Although Equation 2 is known, conventional systems have presented no solution to Equation 2 because of its fourth-order nonlinearity and the unknown values for the radiation factor $\epsilon$ for pulse thermometries. In conventional pulse thermometries, the radiation factor $\epsilon$ has either been disregarded as negligible, or calibrated for individual cases. In this invention, Equation 2 has been solved using a perturbation technique and the radiation factor $\epsilon$ can be determined based on the measured temperature response, which is measured in real time. Therefore, in this invention, the temperature measurement error due to radiation effects can be corrected by computer means.

In this invention, the design of the pyrometer probe is used to pull boundary layer flow away from the thermocouple junction, allowing only a central portion of the incoming ambient gas to contact or flow past the thermocouple junction. Therefore, the cooling effect of the portion of ambient gas which is cooled from a wall at a lower temperature is eliminated by drawing the boundary layer flow away from the thermocouple junction. Conventional pulse thermometries have either disregarded this cooling error or calibrated it for individual cases.

When the incoming gas flows near the thermocouple junction at a sonic speed, the gas is cooled due to the pneumatic effect. Conventional thermometries have disregarded the pneumatic cooling error, which may be as high as 1.5 percent. In this invention, the pneumatic cooling is compensated by a computer program which computes the pneumatic cooling effect for each measured temperature signal.

FIG. 1 shows a preferred embodiment of an inlet portion of temperature measuring pyrometer probe 10. Inner hollow body 12 defines inner chamber 14. Inner hollow body 12 has open end 20 which forms communication between inner chamber 14 and ambient gas. "Ambient gas" as used throughout this specification and in the claims refers to the gas surrounding the inlet portion or open end 20 of pyrometer probe 10. As shown in FIGS. 2 and 2A, inner hollow body 12 is mounted within outer hollow body 18. Outer hollow body 18 defines the cooling means.

As shown in FIG. 2 and according to a preferred embodiment, the cooling means includes a water jacket having inlet channel 22 and outlet channel 24. It is important that cooling fluid flows along a longitudinal axis of pyrometer probe 10 to ensure adequate cooling of the nozzle inlet means. However, it is apparent that other cooling channels can be used to accomplish similar heat transfer results. Inlet channel 22 and outlet channel 24 are sealed with respect to and separated from one another along the longitudinal axis of pyrometer probe 10. Inlet channel 22 and outlet channel 24 are in communication with one another near open end 20 of pyrometer probe 10. As shown in FIG. 2A, according to a preferred embodiment of this invention, inlet channel 22 and outlet channel 24 are basically constructed of two shell structures that are secured together, preferably by a welded connection.

Due to the effective cooling of the nozzle inlet means, the temperature $T_w$ of the inner nozzle wall is very low compared with the measured transient temperature T of the thermocouple junction. The radiation compensation term, $(T/T_g)^4 - (T_w/T_g)^4$, where $T_g$ = the incoming ambient gas temperature, is not dependent on $T_w$ because $T_w^4 << T^4$. Therefore, in this invention, the radiation compensation can be reliably calculated based on the transient temperature T measured by thermocouple junction 30, regardless of the thermal ambient conditions.

Referring to FIG. 3, according to one preferred embodiment of this invention, the cooling fluid is passed into inlet 26A, through inlet channel 22 and outlet channel 24, then out of outlet 26B. The cooling fluid is preferably water. Inlet 26A is in communication with inlet channel 22 and outlet 26B is in communication with outlet channel 24. The flowrate of the cooling fluid or cooling medium through the cooling means can be controlled. In one preferred embodiment, a liquid pump, which is shown in FIG. 3 of the drawings, is used to supply pressure and thus control the flowrate of the cooling fluid.

In one preferred embodiment, inlet channel 22 and outlet channel 24 are constructed of stainless steel. Inlet channel 22 and outlet channel 24 may also be constructed of any other suitable material. The cooling fluid which flows through the cooling channel means is preferably water, but can also be any other suitable fluid for cooling pyrometer probe 10.

According to one preferred embodiment of this invention as shown in FIG. 1, the nozzle inlet means is positioned within inner hollow body 12, near open end 20 of pyrometer probe 10. During the temperature measuring phase of operation, the nozzle inlet means directs the ambient gas toward thermocouple junction 30. As shown in FIG. 1, the nozzle inlet means includes converging-diverging nozzle 42 which is secured with respect to inner hollow body 12. As previously stated, the term "converging-diverging" is relative to the direction of ambient gas flow into inner chamber 14, during a temperature sensing mode of operation. Since the incoming ambient gas always achieves sonic velocity within converging-diverging nozzle 42, pneumatic compensation is based on calibrated fluid dynamic calculations. As shown in FIG. 1, converging-diverging nozzle 42 is divided into two separate sections: converging section 44 and diverging section 46. Converging section 44 and diverging section 46 are separated by a spacer means. In one embodiment, channel 56 is defined as the void formed between converging section 44 and diverging section 46. In another embodiment as shown in FIG. 1, the spacer means comprises spacer ring 58 which defines a ring through hole having a diameter that is greater than the diameter of an adjacent section of throat 48 of converging-diverging nozzle 42. It is apparent that any other type of suitable spacer can be positioned between converging section 44 and diverging section 46 and thus define channel 56. As shown in FIG. 1, converging section 44 is secured to inner chamber wall 12, near open end 20 of pyrometer probe 10, and diverging section 46 is secured to inner chamber wall 12, downstream from converging section 44. It is apparent that converging-diverging nozzle 42 can also be constructed in one piece with channel 56 and bypass through holes 50 formed within such one piece.

Figure 1A:
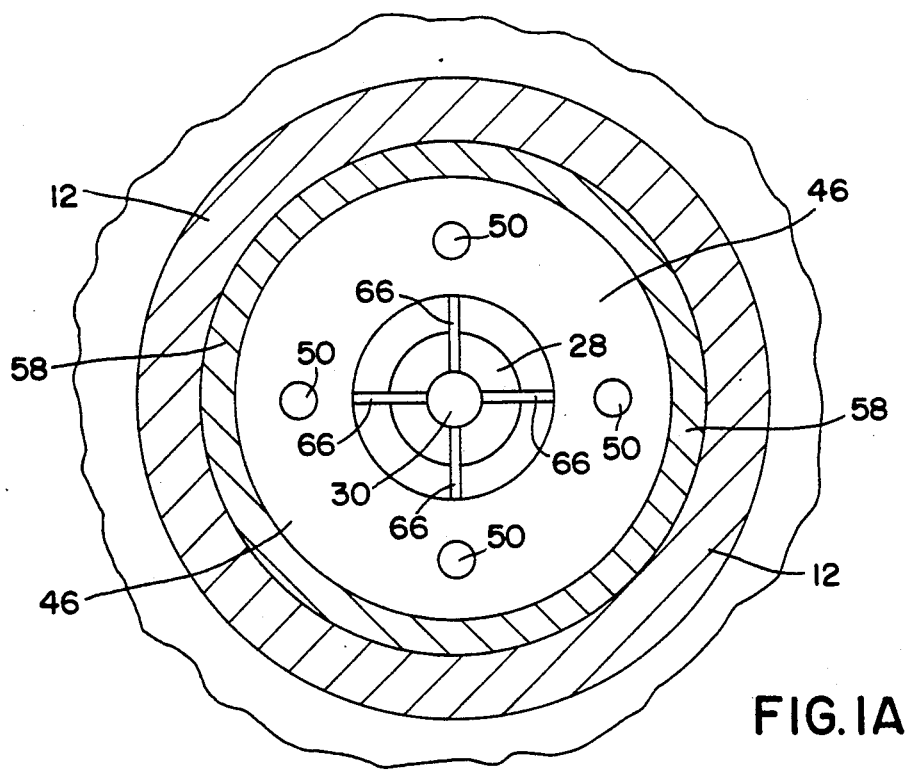
FIG. 1A is a cross-sectional view of a diverging section of a two part converging-diverging nozzle, along line 1A—1A as shown in FIG. 1, according to one embodiment of this invention.

According to one preferred embodiment as shown in FIG. 1, the nozzle inlet means includes a wall suction means for drawing a boundary layer of the ambient gas away from thermocouple junction 30. By drawing the boundary layer away from thermocouple junction 30, thermocouple junction 30 is exposed to convection heat transfer from only a central portion of the incoming ambient gas flow. As shown in FIGS. 1 and 1A, the wall suction means includes bypass through holes 50 positioned within diverging section 46. Bypass through holes 50 must be in communication with channel 56. Preferably, as shown in FIG. 1A, diverging section 46 has four radially spaced bypass through holes 50. Although four bypass through holes 50 are shown, the number and size of bypass through holes 50 may vary as a function of the desired flowrate through each bypass through hole 50. As further shown in FIG. 1, bypass through holes 50 are aligned parallel to the longitudinal axis of pyrometer probe 10 and are perpendicular to channel 56. Although the configuration as shown in FIG. 1 is preferred, it is apparent that the alignment of bypass through holes 50 and channel 56 may vary. It is critical that bypass through holes 50 and channel 56 communicate so that the boundary layer of incoming ambient gas is drawn through channel 56 and through bypass through holes 50. The position and dimensions of the wall suction means are determined based on thermodynamic and fluid dynamic calculations.

In one preferred embodiment of this invention, the nozzle inlet means is constructed of silver or a silver alloy. Conventional nozzle inlets have been constructed of ceramic which is fragile, particularly under extreme thermal shock. According to this invention, silver or a silver alloy allows for extended use of the elements, even under extreme conditions.

As shown in FIG. 1, a positioner means comprising a two-hole ceramic insulation tube 29 is used to mount thermocouple 28 within throat 48 of converging-diverging nozzle 42. According to a preferred embodiment, the positioner means includes support body 66 which precisely positions thermocouple junction 30 in a centered cross-sectional area of throat 48, so that the outwardly extending tip of thermocouple junction 30 is even with a plane defined by upstream surface 56A of diverging section 46. Support body 66 is used to secure ceramic insulation tube 29 which houses the thermocouple wires. The position of thermocouple junction 30, as described above, is critical to ensure that the boundary layer of the ambient gas is drawn away from thermocouple junction 30 through channel 56 and bypass through holes 50. Such physical limitations also ensure that the boundary layer will not contact thermocouple junction 30.

As shown in FIG. 3, according to a preferred embodiment of this invention, control conduit 32 is in communication with inner chamber 14. Control conduit 32 also is in communication with outlet conduit 34 and inlet conduit 38. Control valve 36 is mounted in outlet conduit 34 and controls the flow of cooling gas through outlet conduit 34. An operator of control valve 36 responds to a controlled signal emitted from computing means 60. The cooling gas is preferably compressed air. The flowrate of the cooling gas through the cooling means can be controlled. In one preferred embodiment, an air compressor, which is not shown in the drawings, is used to supply pressure and thus control the flowrate of the cooling gas. Control valve 40 is mounted in inlet conduit 38 and controls the flow of ambient gas through inlet conduit 38. Computing means 60 also emits a controlled signal to an operator of control valve 40. Inlet conduit 38 is preferably connected to a suction pump, which is not shown in the drawings, or another suitable suction device, which draws ambient gas through inlet conduit 38 and thus inner chamber 14. It is apparent that other suitable piping and/or valve arrangements can be used to accomplish the same result of alternately pulsing the ambient gas and the cooling gas through inlet conduit 38 and inner chamber 14.

In one embodiment of this invention, a method of eliminating temperature measuring error due to radiation heat transfer and pneumatic cooling includes selectively directing ambient gas through the nozzle inlet means toward thermocouple junction 30. As described above, the ambient gas achieves sonic velocity as it flows through converging-diverging nozzle 42, and past thermocouple junction 30. A boundary layer of the ambient gas is drawn away from thermocouple junction 30. Only a central portion of the ambient gas flow contacts thermocouple junction 30. Measured temperature signals emitted from thermocouple junction 30 are processed and recorded in real time. Computing means 60, which is electronically coupled to thermocouple junction 30, receives measured temperature signals and when the temperature signals are equal to a predetermined temperature signal, computing means 60 emits an electronic signal for appropriate control valves or other control devices to terminate gas suction and, simultaneously, to direct cooling gas through inner chamber 14 to cool thermocouple 28 and inner hollow body 12. When computing means 60 receives measured temperature signals from thermocouple junction 30, indicating that thermocouple junction 30 has cooled, computing means 60 emits signals which are used to redirect the ambient gas flow into inner chamber 14, thus beginning a new temperature measuring cycle. Computing means 60 calculates the radiation heat transfer loss and pneumatic cooling effect for each of the measured temperature signals. Computing means 60 also extrapolates the actual gas temperatures and provides a precise, instantaneous temperature.

While in the foregoing specification this invention has been described in relation to certain preferred embodiments thereof, and many details have been set forth for purpose of illustration, it will be apparent to those skilled in the art that this invention is susceptible to additional embodiments and that certain of the details described herein can be varied considerably without departing from the basic principles of the invention.

We claim:

1. A temperature measuring pyrometer probe comprising:

an inner hollow body defining an inner chamber, said inner hollow body having an open end, said inner chamber in communication with ambient gas surrounding the pyrometer probe at said open end, said inner hollow body mounted within an outer hollow body forming cooling channel means for cooling said inner hollow body;

a converging-diverging nozzle secured to an inner chamber wall of said inner hollow body, said converging-diverging nozzle positioned to direct said ambient gas into said inner chamber toward a thermocouple junction of a thermocouple, said converging-diverging nozzle having a wall suction channel for drawing a boundary layer of an ambient gas flow away from said thermocouple junction;

suction inlet means for admitting said ambient gas surrounding the pyrometer probe into said converging-diverging nozzle and drawing said ambient gas flow through said inner chamber and said wall suction channel;

positioner means for mounting said thermocouple junction in a centered position within a throat of said converging-diverging nozzle downstream, with respect to said ambient gas flow, from said wall suction channel;

gas cooling means for pulsing reverse cooling gas flow through said converging-diverging nozzle, computing means for controlling said reverse cooling gas flow;

said computing means continuously alternating said cooling gas flow and said ambient gas flow through said inner chamber; said thermocouple junction electrically coupled to said computing means; and said computing means calculating radiation heat transfer losses and pneumatic cooling and determining an instantaneous gas temperature.

2. A temperature measuring pyrometer probe according to claim 1 wherein said cooling channel means further comprises said inner hollow body and said outer hollow body defining an inlet channel and an outlet channel, said inlet channel and said outlet channel sealably separated from each other along a longitudinal axis of the pyrometer probe, and said inlet channel in communication with said outlet channel near said open end.

3. A temperature measuring pyrometer probe according to claim 2 wherein said inlet channel and said outlet channel are of stainless steel.

4. A temperature measuring pyrometer probe according to claim 1 wherein said suction inlet means comprises a vacuum pump in communication with said inner chamber.

5. A temperature measuring pyrometer probe according to claim 1 wherein said gas cooling means comprises a gas compressor in communication with said inner chamber.

6. A temperature measuring pyrometer probe according to claim 1 wherein said converging-diverging nozzle further comprises a converging section and a diverging section, said converging section is positioned near said open end, and said diverging section is positioned downstream, with respect to said ambient gas flow, from said converging section and defines said wall suction channel.

7. A temperature measuring pyrometer probe according to claim 6 wherein spacer means are positioned between said converging section and said diverging section, forming said wall suction channel.

8. A temperature measuring pyrometer probe according to claim 6 wherein said diverging section has a plurality of bypass through holes in communication with said wall suction channel.

9. A temperature measuring pyrometer probe according to claim 8 wherein said bypass through holes are radially spaced evenly about and approximately parallel to a centerline of said throat.

10. A temperature measuring pyrometer probe according to claim 1 wherein said nozzle inlet means are of silver.

11. A temperature measuring pyrometer probe according to claim 1 wherein said positioner means further comprise a support body positioned within said inner chamber and secured to an inner chamber wall of said inner hollow body, said thermocouple attached to said support body and said thermocouple positioned within said inner chamber such that an outwardly extending tip of said thermocouple junction aligns with a downstream edge of said wall suction channel, downstream with respect to said ambient gas flow.

12. A temperature measuring pyrometer probe according to claim 1 wherein said pyrometer probe further comprises a control conduit in communication with said inner chamber downstream, with respect to said ambient gas flow, from said open end.

13. A temperature measuring pyrometer probe according to claim 12 further comprising: an inlet conduit in communication with said control conduit, an inlet control valve mounted within said inlet conduit, an outlet conduit in communication with said control conduit, and an outlet control valve mounted within said outlet conduit.

14. A temperature measuring pyrometer probe according to claim 13 wherein said computing means emits signals to an inlet operator of said inlet control valve and an outlet operator of said outlet control valve, and said inlet control valve and said outlet control valve alternately open and close in response to said signals.

15. A temperature measuring pyrometer probe according to claim 1 wherein said computing means further comprise processing means for processing and recording signals from said thermocouple junction in real time and said computing means performs an extrapolation calculation to determine said instantaneous gas temperature of said ambient gas.

* * * * *